United States Patent 3,460,954
Patented Aug. 12, 1969

3,460,954
BaO-Nb₂O₅-SiO₂ GLASS COMPOSITIONS FOR USE IN FIBER-OPTICS
John C. Young, Portuguese Bend, Calif., assignor, by mesne assignments, to The Bendix Corporation, a corporation of Delaware
No Drawing. Filed May 21, 1964, Ser. No. 369,313
Int. Cl. C03c 13/00, 3/08, 3/04
U.S. Cl. 106—54    2 Claims

ABSTRACT OF THE DISCLOSURE

Glass compositions having high refractive indices and other physical and thermal properties which make them particularly useful in the production of fiber-optics structures consist essentially of from about 5% to about 40% by weight of at least one oxide of the group consisting of $Nb_2O_5$ and $Ta_2O_5$, at least 90% of the aggregate of said oxides being $Nb_2O_5$, from about 15 to about 45% by weight of BaO and from about 25% to about 40% by weight of at least one oxide of the group consisting of $SiO_2$ and $B_2O_3$, at least 70% of the aggregate of said oxides being $SiO_2$. The compositions may also contain up to about 15% by weight of at least one oxide of the group consisting of CaO and SrO, up to about 10% by weight of at least one oxide of the group consisting of ZnO and CdO, up to about 5% by weight of at least one oxide of the group consisting of $Na_2O$, $K_2O$ and $Li_2O$, and up to about 36% by weight of $La_2O_3$. The compositions should be substantially free of lead and contain not more than an aggregate amount of 5% by weight of oxides of the group consisting of $TiO_2$, $ZrO_2$, $HfO_2$ and $ThO_2$.

---

This invention relates to new glass compositions having refractive indices in the range of from about 1.65 to about 1.85 and having other physical and thermal properties rendering them suitable for use in the production of fiber-optics structures.

In the making of fiber-optics structures the core glass should have the highest possible refractive index, a medium to high softening point, a long working range and, for most applications, a relatively high thermal coefficient of expansion. High stability at the drawing and working temperatures and high transmission in the visible spectrum are also of particular importance.

In the past glasses of high refractive index have typically large amounts of lead or titanium oxides. For use in fiber-optics structures lead oxide in any appreciable quantity is objectionable, whereas because of the practical difficulty in producing titanium oxide or other titanium compounds sufficiently free of coloring impurities, glasses containing sufficient amount of titanium to yield a satisfactorily high index of refraction are found to be objectionably colored in long fiber lengths. Also, glasses containing lead or titanium in substantial amounts are apt to be of too short working range or tend to devitrify at working temperatures.

It has now been found that these difficulties can be avoided by eliminating lead and titanium, as well as such heavy metals as zirconium, hafnium and thorium, except in quite small quantities and substituting relatively large amounts of niobium oxide as a major high refractive index producer. The presence of tantalum oxide, the chief natural impurity present in commercially available niobium compounds, in amounts not exceeding about 10% by weight of the amount of niobium is not injurious and in minor amounts tends to improve the stability of the compositions. At least 90% of the aggregate amount of $Nb_2O_5$ and $Ta_2O_5$ should be $Nb_2O_5$.

Lanthanum oxide is very similar to barium oxide in its effect on the physical properties of fiber-optics core glass other than refractive index and the two oxides are interchangeable within rather broad limits in the glass formulations. Their effects on the refractive index are, however, quite different and the index increases with greater La to Ba ratios.

In general the glass compositions of the invention contain from about 25% to about 40% by weight of silica up to about 30% of which may be substituted by boric oxide, at least 70% of the aggregate of $SiO_2$ and $B_2O_3$ being $SiO_2$ from about 15% to about 45% by weight of barium oxide, and from about 5% to about 50% by weight of niobium oxide. Other alkaline earth oxides such as calcium oxide and strontium oxides may be added in amounts up to about 15% by weight. Zinc or cadmium oxide may be included in amounts up to about 10% by weight and the presence of alkali metal oxides such as sodium, potassium or lithium oxides, especially the latter, is useful in amounts up to about 5% by weight in controlling thermal expansion and softening point without adversely affecting other desirable properties. Lanthanum oxide when used may be present in amounts up to about 36% by weight. The compositions are substantially free from lead and contain not more than an aggregate amount of 5% by weight of titanium, zirconium, hafnium and thorium oxide.

Particularly useful are compositions containing from about 20% to about 40% by weight of niobium oxide and those containing from about 5% to about 20% by weight of niobium oxide together with from about 10% to about 36% by weight of lanthanum oxide.

The following table includes representative glass compositions of the invention, all parts being by weight:

| Examples | 1 | 2 | 3 | 4 | 5 | 6 |
|---|---|---|---|---|---|---|
| $SiO_2$ | 25 | 22 | 25 | 25 | 22 | 31 |
| $B_2O_3$ | 10 | 3 | | | 3 | 6 |
| BaO | 42 | 45 | 30 | 18 | 31 | 43 |
| CaO | 10 | | 10 | 10 | | |
| ZnO | 5 | 5 | 5 | 5 | 5 | |
| $Nb_2O_5$ | 6 | 20 | 28 | 40 | 17 | 5 |
| $La_2O_3$ | | | | | 20 | 15 |
| $Na_2O$ | | 5 | | | | |
| $Li_2O$ | 2 | | 2 | 2 | 2 | |
| Refr. Ind | 1.70 | 1.78 | 1.79 | 1.81 | 1.78 | 1.68 |
| V¹ | 48 | 39 | 36 | 33 | 29 | 43 |
| Spec. grav | 3.8 | 4.4 | 3.9 | 3.8 | 4.4 | 4.1 |

¹ Abbé dispersion values.

The glass compositions of the invention may be prepared by melting a mix of the batch component in conventional crucibles free from deleterious contaminating materials. Platinum crucibles are particularly suitable. The batch is composed of oxides or compounds decomposable to oxides under the conditions of melting in the proper proportion to yield the specified composition. In general, niobium, lanthanum, zinc and cadmium are added as oxides. Barium may be added as oxide or carbonate or, in whole or in part, as the peroxide; calcium, strontium, sodium, potassium and lithium may be conveniently added as carbonates. Silica may be added as high grade quartz sand and boron may be added as boric acid.

The glasses melt and refine readily at temperatures between 2450° and 2600° F. They can be reheated and drawn into rods or fibers at 1500° F. or less. The glasses of the invention are virtually colorless even in long fiber lengths and they are very stable at the working temperatures.

Although the glasses of the invention are particularly useful as core glasses in fiber-optics structures, they are by no means limited to such uses. The glasses have optical properties comparable to the so-called "Lanthanum Flints" and, therefore, make excellent optical glasses, Also because of their relative hardness and resistance to chemical attack, they could be used in Abbé type refractometers for the prisms which at present are made of soft, easily scratched and tarnished lead-containing glasses. The glasses of higher niobium content are considerably lighter in weight than their conventional optical glass counterparts and for that reason they would be useful in massive optical elements where weight is an important consideration.

I claim:

1. A glass composition having a refractive index of at least 1.75 and consisting essentially of from about 20% to about 40% by weight of at least one oxide selected from the group consisting of $Nb_2O_5$ and $Ta_2O_5$, at least 90% of the aggregate of said oxides being $Nb_2O_5$, from 0 to about 15% by weight of at least one oxide selected from the group consisting of CaO and SrO, from about 15% to about 45% by weight of BaO, from 0 to about 10% by weight of at least one oxide selected from the group consisting of ZnO and CdO, from 0 to about 5% by weight of at least one oxide selected from the group consisting of $Na_2O$, $K_2O$ and $Li_2O$, and from about 25% to about 40% of at least one oxide selected from the group consisting of $SiO_2$ and $B_2O_3$, at least 70% of the aggregate of said oxides being $SiO_2$, said composition being substantially free of lead and containing not more than an aggregate amount of 5% by weight of oxides of the group consisting of $TiO_2$, $ZrO_2$, $HfO_2$ and $ThO_2$.

2. A glass composition having a refractive index of at least 1.75 and consisting essentially of from about 5% to about 20% by weight of at least one oxide selected from the group consisting of $Nb_2O_5$ and $Ta_2O_5$, at least 90% of the aggregate of said oxides being $Nb_2O_5$, from 0 to about 15% by weight of at least one oxide selected from the group consisting of CaO and SrO, from about 15% to about 45% by weight of BaO, from about 10% to about 36% by weight of $La_2O_3$, from 0 to about 10% by weight of at least one oxide selected from the group consisting of ZnO and CdO, from 0 to about 5% by weight of at least one oxide selected from the group consisting of $Na_2O_2$, $K_2O$ and $Li_2O$, and from about 25% to about 40% of at least one oxide selected from the group consisting of $SiO_2$ and $B_2O_3$, at least 70% of the aggregate of said oxides being $SiO_2$, said composition being substantially free of lead and containing not more than an aggregate amount of 5% of oxides of the group consisting of $TiO_2$, $ZrO_2$, $HfO_2$ and $ThO_2$.

References Cited

UNITED STATES PATENTS

| | | | |
|---|---|---|---|
| 2,576,521 | 11/1951 | Kreidl | 106—54 |
| 2,859,138 | 11/1958 | Blanchard | 106—48 |
| 3,029,152 | 4/1962 | Milne et al. | 106—54 |
| 3,114,066 | 12/1963 | Allen et al. | 106—52 |

HELEN M. McCARTHY, Primary Examiner

U.S. Cl. X.R.

106—50, 52; 350—96, 176